UNITED STATES PATENT OFFICE.

RICHARD W. DICKENSON, JR., OF SIOUX FALLS, SOUTH DAKOTA.

COMPOSITION OF MATTER TO BE USED AS A FLOUR.

1,271,139.      Specification of Letters Patent.      Patented July 2, 1918.

No Drawing.      Application filed November 16, 1917. Serial No. 202,326.

*To all whom it may concern:*

Be it known that I, RICHARD W. DICKENSON, Jr., a citizen of the United States, residing at Sioux Falls, in the county of Minnehaha and State of South Dakota, have invented a new and useful Composition of Matter to be used as a Flour for Baking Bread, Biscuits, Muffins, Pastries, &c., of which the following is a specification.

My composition consists of the following ingredients, combined in the proportions stated, viz:

| | |
|---|---|
| Bran | .15 |
| Whole wheat flour | .10 |
| Corn meal | .24 |
| Shorts | .09 |
| Rye flour | .07 |
| Wheat flour | .35 |

These ingredients are to be thoroughly mixed together by means of a hopper or other suitable means.

By the use of the above composition, a flour is made which utilizes the by-products of wheat flour, and from the flour thus made, bread, biscuits, muffins, pastries, etc., can be made in like manner as from wheat flour; and the articles so made from it will remain in a condition of freshness, under the same conditions, about three times as long as will those made from the wheat flour.

I claim:

The herein described composition of matter, consisting of bran, whole wheat flour, corn meal, shorts, rye flour and wheat flour, substantially as described and for the purpose specified.

RICHARD W. DICKENSON, Jr.

Witnesses:
W. W. NEIDENHESIR,
P. E. KERR.